Figure 1:
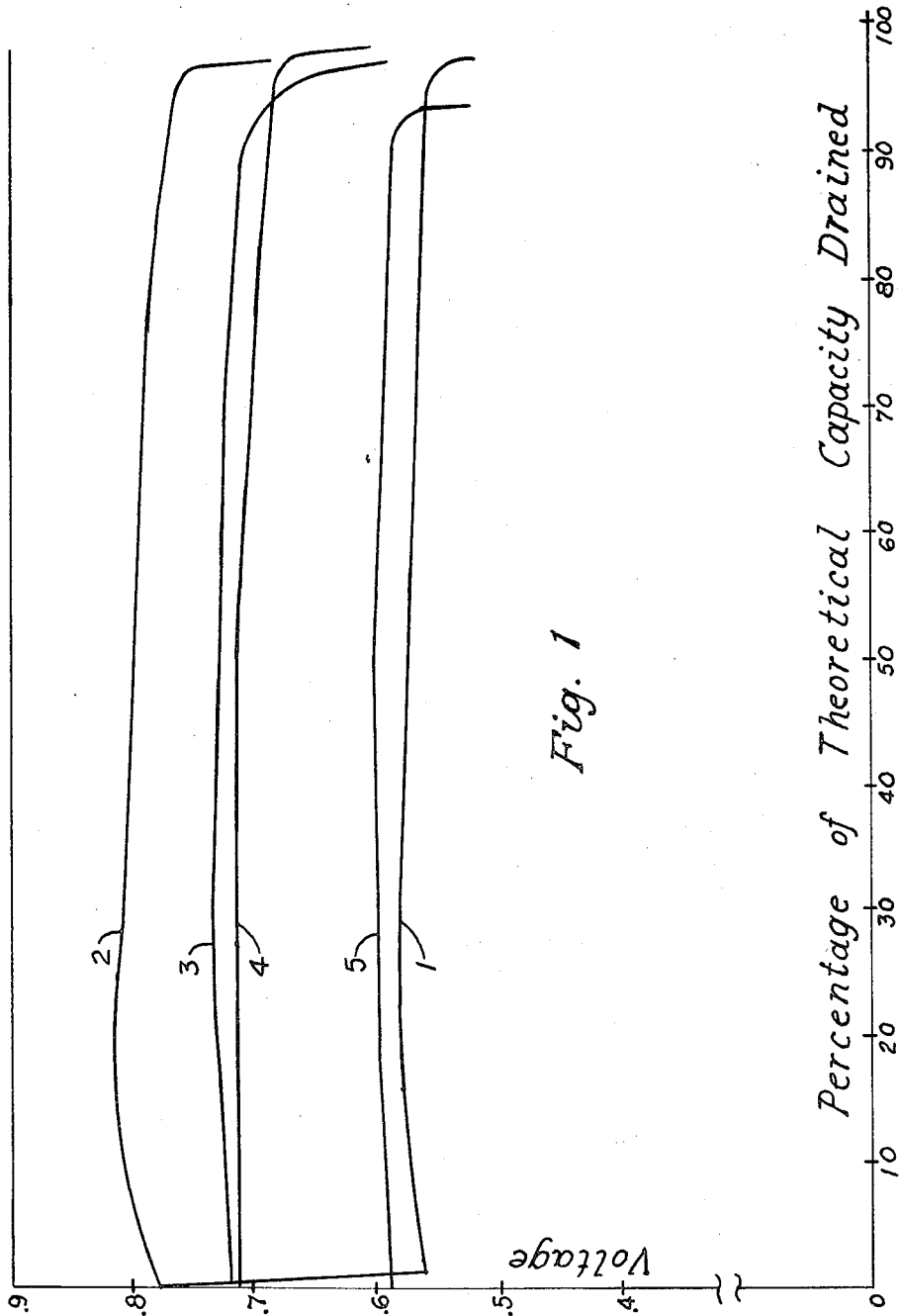

June 21, 1960 T. B. JOHNSON ET AL 2,941,909
GENERATOR CELL ELECTROLYTE
Filed March 28, 1958 2 Sheets-Sheet 1

INVENTORS
THEODORE B. JOHNSON
FRED SENKO
BY John H. Lewis Jr.
Harry E. Braddock
ATTORNEYS

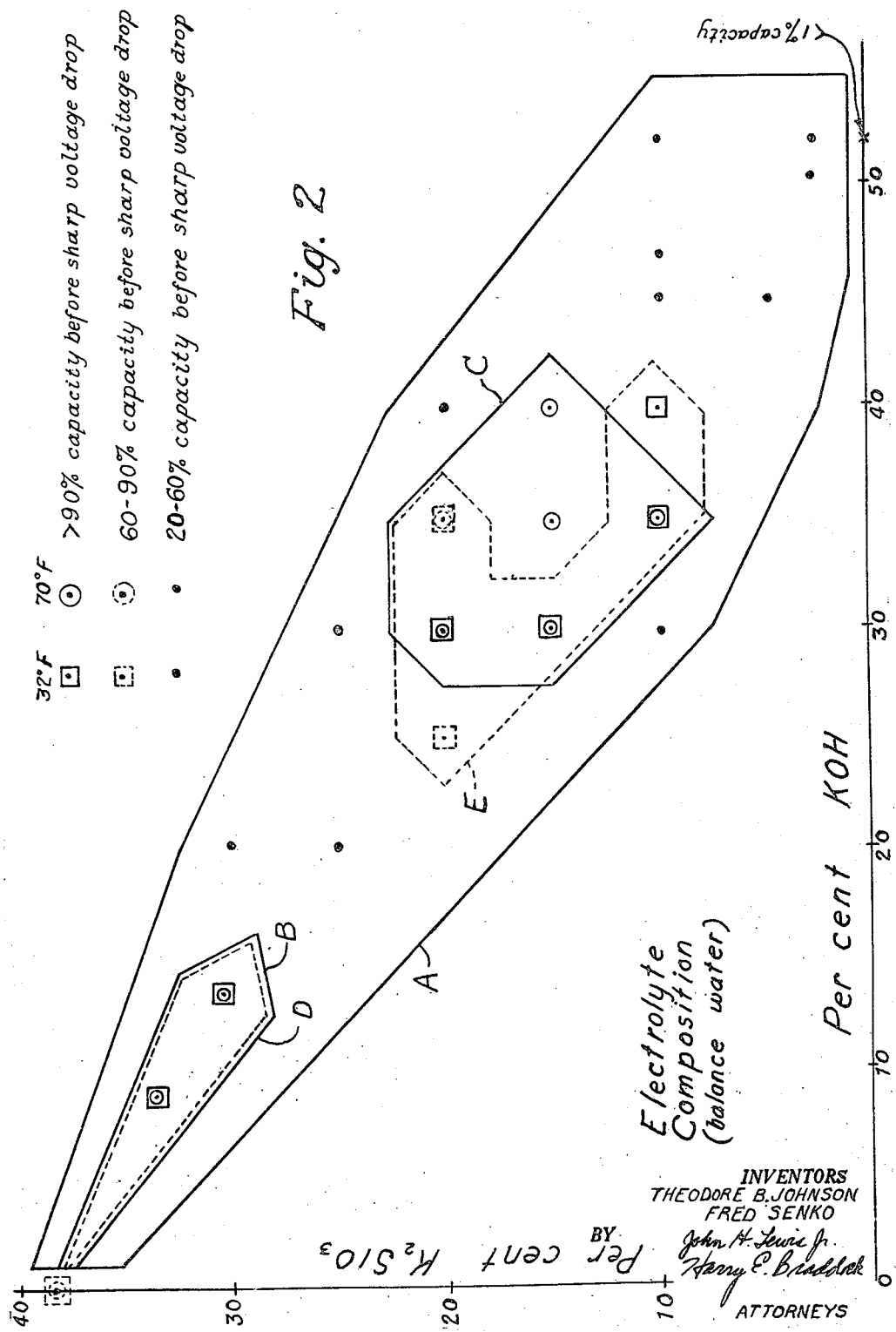

United States Patent Office 2,941,909
Patented June 21, 1960

2,941,909

GENERATOR CELL ELECTROLYTE

Theodore B. Johnson, Stratford, and Fred Senko, Fairfield, Conn., assignors to Remington Arms Company, Inc., Bridgeport, Conn., a corporation of Delaware Filed Mar. 28, 1958, Ser. No. 725,469

4 Claims. (Cl. 136—154)

This invention relates to electrolytes for current generating cells particularly for cells having anodes comprising at least 50 atomic percent titanium, such as those disclosed in the copending U.S. patent application of John McCallum et al. Serial No. 706,890.

Current generating cells having titanium alloy anodes with alkaline electrolytes have various advantageous properties, such as long shelf life and high energy capacity per unit volume and weight. It has been found that the properties of such cells can be made even better by adding an alkali metal silicate to the alkaline electrolyte. The addition of the alkali metal silicate enables the cells to provide higher currents at higher voltages over a wide temperature range.

In alkaline primary cells having titanium-molybdenum alloy anodes and various other titanium alloy anodes, the oxidation products of the anodes are oxides or alkali metal salts, or both, of titanium and of the other ingredients of the alloys. Some of these products are substantially insoluble in the electrolyte, and during drainage a heavy deposit of the oxidation products grows on the anode, causing an abrupt decrease in the voltage of the cell after a period of drain. With higher currents the potential of the cell decreases sooner than with lower currents. In some cells the voltage decrease is greater than in others. The addition of alkali metal silicate to the electrolyte eliminates the voltage drop in the cell and allows higher currents to be drawn over a wide temperature range.

The present invention comprises in a current generating cell having a cathode, an anode containing at least 50 atomic percent titanium, and an alkaline electrolyte, the improvement that comprises adding an alkali metal silicate to the electrolyte. Preferably the improved electrolyte comprises about 1 to 55 percent potassium hydroxide and about 1 to 40 percent potassium silicate, with the total of the potassium hydroxide and potassium silicate not more than about 65 percent of the total weight of the electrolyte. Preferred ranges of electrolyte composition that provide especially advantageous results in particular uses and conditions are indicated in the drawings.

In the drawings:

Fig. 1 is a graph in rectangular coordinates containing curves of voltage as a function of drainage in several current generating cells; and Fig. 2 is a diagram in rectangular coordinates of electrolyte compositions in accordance with the present invention; the areas thereon indicating useful and preferred composition ranges.

Typical of the improvement obtainable with electrolytes according to the present invention are the results obtained in tests made on six cells each having an anode of an alloy of 70 percent titanium and 30 percent molybdenum, and a cathode of 92 percent mercuric oxide, HgO, and 8 percent graphite, C. The electrolyte used in three of these cells comprised 52 percent potassium hydroxide, KOH, balance water; while the electrolyte in the other three cells comprised 15 percent potassium silicate, $K_2SiO_3$, 40 percent potassium hydroxide, KOH, balance water. (All percentages of materials mentioned herein are weight percentages, where not otherwise specified.) Each cell was drained continuously for twenty-four hours, one cell of each electrolyte type at a load of 10,000 ohms at a temperature of 70° F., one cell of each type at a load of 2,000 ohms at a temperature of 70° F., and one cell of each electrolyte type at a load of 2,000 ohms at a temperature of 32° F. The voltage and current provided by each cell at the end of the twenty-four hours of drain were measured, and are listed in Table I.

TABLE I

*Voltage and current after 24 hours of drain*

| Load, ohms | Temp., °F. | Electrolyte | | | |
|---|---|---|---|---|---|
| | | 52% KOH | | 15% $K_2SiO_3$, 40% KOH | |
| | | Voltage, volts | Current, ma. | Voltage, volts | Current, ma. |
| 10,000 | 70 | .58 | .058 | .81 | .081 |
| 2,000 | 70 | .46 | .23 | .73 | .365 |
| 2,000 | 32 | .30 | .15 | .52 | .26 |

From Table I, calculations show that the electrolyte containing the silicate provides nearly twice (195%) the power (voltage times current) obtained without the silicate in the electrolyte, with a 10,000-ohm load at 70° F. With a 2,000-ohm load at 70° F., the silicate-containing electrolyte provides two and one-half times the power obtained without the silicate; and with a 2,000-ohm load at 32° F., three times the power. Thus the improvement obtained by adding the silicate to the electrolyte is greater for the more severe conditions of higher current drain and lower temperature.

The action of the silicate appears to be partly to increase the solubility of the anode products, and partly to change the form of the solid anode products in such a way that current continues to flow from the anode to the electrolyte without a drop in voltage.

Various other common cathode materials such as manganese dioxide, $MnO_2$, silver oxide, $Ag_2O$, lead dioxide, $PbO_2$, etc., can be used with the silicate electrolytes of this invention with no appreciable effect upon their normal cathode characteristics.

Typical results of long-term drainage tests are shown in Fig. 1. The curves show the voltage for each of five cells plotted against percentage of theoretical drainage capacity. The electrodes were the same as in the above example, 70% Ti, 30% Mo anodes, and 92% HgO, 8% C cathodes. Each cell had a theoretical capacity of 285 milliampere hours. All were miniature cells, identical in size, shape, and electrode compositions, and differing only in electrolyte composition. Table II identifies for each curve the electrolyte composition in percentage of $K_2SiO_3$ and percentage of KOH, the balance being water, the temperature and load at which drainage took place, the total drainage in milliampere hours, the average current in milliamperes during drainage, the average power in milliwatts during drainage, the total drainage in milliwatt hours, and the average voltage during drainage.

TABLE II

| Curve | Percent K₂SiO₃ | Percent KOH | Temp. | Load | Ma.h. | Ma.ₐᵥ | Mw.ₐᵥ | Mw.h. | V.ₐᵥ |
|---|---|---|---|---|---|---|---|---|---|
| 1 | 0 | 52 | 70 | 10K | 279 | .056 | .032 | 158 | .566 |
| 2 | 15 | 40 | 70 | 10K | 279 | .079 | .062 | 221 | .792 |
| 3 | 15 | 40 | 70 | 2K | 278 | .362 | .263 | 202 | .727 |
| 4 | 20 | 30 | 70 | 2K | 280 | .353 | .250 | 198 | .707 |
| 5 | 20 | 30 | 32 | 5K | 268 | .119 | .071 | 160 | .597 |

Curve 1 is the only curve shown for a cell in which the electrolyte did not contain any silicate. Curve 1, the lowest curve, should be compared to curve 2, the highest curve, for the cell containing 15% silicate in which the drainage temperature and load were the same as for the cell of curve 1. The advantages of the silicate are obvious from curves 1 and 2 and lines 1 and 2 of Table II. Curves 3, 4, and 5 and lines 3, 4, and 5 of Table II clearly show the advantages of the silicate addition under drainage at higher currents and at lower temperature. The corresponding curves for the alkaline electrolyte with no silicate are even lower, of course, than curve 1.

The improvements in power, voltage and energy obtained by adding the silicate to the electrolyte are apparent.

Fig. 2 indicates the results obtained with a number of specific electrolyte compositions as to the percentage of capacity that can be drained before a sharp voltage drop is encountered as at the right ends of curves 2–5 in Fig. 1 and at the left end of curve 1 in Fig. 1. In Fig. 2, curve A defines an area indicating a range of useful compositions according to the present invention. Curves B and C define areas indicating a preferred range of compositions for best results at room temperature. Curves D and E define areas indicating a preferred range of compositions for best results at low temperatures, as in the order of 32° F. While superior results are obtained with compositions within the preferred areas, it should be emphasized that all of the electrolytes within the composition range defined by curve A provide substantial improvement in performance over the alkaline electrolyte containing no silicate.

What is claimed is:

1. In a current generating cell comprising a cathode, and an anode comprising at least 50 atomic percent titanium; an electrolyte comprising potassium hydroxide and potassium silicate in the range represented by the area enclosed by the curve A in Fig. 2.

2. In a current generating cell comprising a cathode, and an anode comprising at least 50 atomic percent titanium; an electrolyte comprising potassium hydroxide and potassium silicate in the range represented by the areas enclosed by the curves B and C in Fig. 2.

3. In a current generating cell comprising a cathode, and an anode comprising at least 50 atomic percent titanium; an electrolyte comprising potassium hydroxide and potassium silicate in the range represented by the areas enclosed by the curves D and E in Fig. 2.

4. In a current generating cell comprising a cathode, and an anode comprising at least 50 atomic percent titanium; an electrolyte comprising potassium hydroxide and potassium silicate in the range represented by the areas enclosed by the curves B, C, and E in Fig. 2.

References Cited in the file of this patent

UNITED STATES PATENTS

| 858,862 | Edison | July 2, 1907 |
| 2,631,115 | Fox | Mar. 10, 1953 |